Patented Sept. 2, 1941

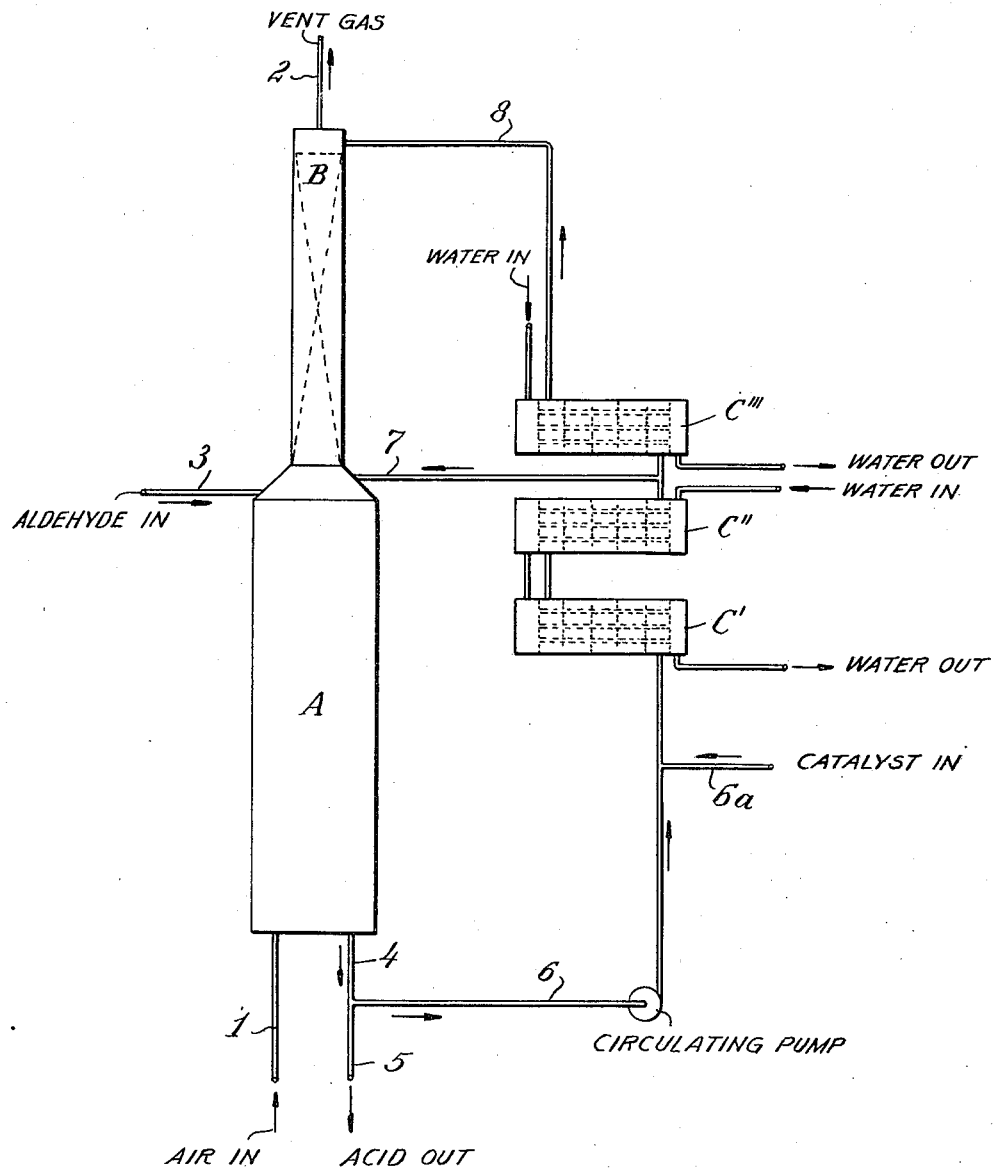

2,254,725

UNITED STATES PATENT OFFICE 2,254,725

MANUFACTURE OF ACETIC ACID

Dwight C. Bardwell, Syracuse, N. Y., assignor to The Solvay Process Company, New York, N. Y., a corporation of New York Application May 4, 1939, Serial No. 271,661

9 Claims. (Cl. 260—530)

This invention is directed to the preparation of acetic acid by the oxidation of acetaldehyde.

In the art of producing acetic acid by oxidation of acetaldehyde, it is known to contact air or other oxygen-containing gas with a liquid containing acetaldehyde, scrub the vapors issuing therefrom to remove acetaldehyde, and continuously introduce acetaldehyde and remove the liquid product.

One mode of carrying out such a procedure is to cause the process to proceed to substantial exhaustion of the acetaldehyde contained in the liquor. This may be done, for example, by causing a countercurrent flow of air and acetic acid containing acetaldehyde, and maintaining the temperature in the bottom part of the oxidizing vessel sufficiently high to vaporize all the remaining acetaldehyde, or it may be done by causing such prolonged contact between the oxygen-containing gas and reaction liquor that substantially complete oxidation of the aldehyde occurs. Alternatively, a combination of such means might be used. If a temperature sufficiently high to vaporize the last 5% of the aldehyde is employed, the formation of by-products such as carbon dioxide and water becomes considerable. Aldehyde polymerization products, methane, formaldehyde, and formic acid may also be formed. If the process is prolonged, not only will the reaction become so slow that it is impracticable, but even at quite moderate temperatures a tendency toward complete oxidation of the aldehyde to carbon dioxide and water has been observed. A further danger arising when concentrations less than about 5% are employed is that, if the supply of aldehyde should for any reason be cut off temporarily, the small reserve may be reduced to a point such that unduly large amounts of oxygen may pass to parts of the system where there may still be present sufficient aldehyde vapor to form explosive mixtures with the oxygen.

A practice heretofore suggested which might avoid these difficulties is the employment of high concentrations of acetaldehyde and the maintenance of a large acetaldehyde concentration in the exit liquor. Such a method, however, runs into difficulties. Thus if high concentrations of acetaldehyde are employed, excessive evolution of heat occurs in the region where the oxygen concentration is high. If this heat is not rapidly dissipated, the marked temperature rise which occurs will have several undesirable results; for example, the formation of explosive mixtures of oxygen and acetaldehyde vapor, increased quantities of by-products, and a greater rate of attack on equipment. The dissipation of this heat is not a simple matter. Even with extremely large recirculation of the reaction liquor through external coolers, for example, with a circulation of reaction liquor in quantities as much as 150 times the aldehyde feed and with cooling of the recirculated liquor to 40° C. and less, it may be impossible to keep the temperature of the reaction liquor, in that portion of the system where the oxygen concentration is high, at less than 90° C., which is generally about the maximum permissible temperature. Internal cooling as a supplement to or substitute for external cooling is not desirable due to greater expense of construction and maintenance of cooling equipment. Merely increasing the rate of circulation while permitting more rapid dissipation of heat requires high liquid velocities and hence larger equipment or higher operating costs. Moreover, it promotes entrainment of gas by the liquid and may thus reduce the efficiency of the heat exchangers, and also may interfere with the free and uniform circulation of liquid.

Other means of avoiding high temperatures are also subject to disadvantages. Thus dilution of the air used for oxidation increases the power required for compression and carries off further quantities of acetaldehyde vapor, which must be completely recovered to make the process competitive with other means of producing acetic acid. Precooling of the air sufficiently to eliminate excessive temperatures requires special refrigerating equipment for reducing the temperature of the air to below normal atmospheric temperatures.

A further disadvantage in the use of high aldehyde concentrations is the greater expense of distilling aldehyde from the product.

I have found that there is an optimum range of aldehyde concentrations which avoids or considerably reduces the difficulties enumerated above. According to my invention, an oxygen-containing gas is contacted with an acetic acid solution of acetaldehyde and the concentration of acetaldehyde in the reacting liquid is maintained between 5% and 15% by weight.

At concentrations of acetaldehyde within this range an acceptably rapid reaction rate can be maintained without the necessity of employing unduly high temperatures, the temperature of the reaction liquor can be readily controlled (e. g., by recirculation through external coolers), there is only a moderate amount of acetaldehyde in the vent gases and vapors leaving the vessel and hence the problem of scrubbing is made easy, and there is little difficulty in separating acetaldehyde from the acetic acid in the liquor withdrawn as final product.

The process of this invention may be employed with air or other oxygen-containing gas, for example, with artificially diluted or enriched oxygen mixtures. The process may be carried out over a considerable range of temperatures and may be either cocurrent or countercurrent and with or without recirculation of the reaction liquor. The contact between the oxygen-containing gas and reaction liquor may be effected by various means, such as by passing the reaction liquor down a packed column through which air is passed in the same or opposite direction, or it may be carried out by bubbling air through a body of reaction liquor. A variety of means of cooling the reaction liquor may be employed, and the process may be operated at various pressures consistent with the partial pressure of acetaldehyde dissolved in acetic acid at the various reaction temperatures.

The preferred mode of carrying out the process of this invention is as follows:

Dried air is bubbled upwardly through a body of reaction liquor about 15 to about 25 feet deep maintained at a temperature between 40° C. and 90° C. and a pressure between 100 pounds and 200 pounds per square inch absolute and comprising a concentration of acetaldehyde between 5% and 15% by weight and the balance acetic acid containing a small amount of dissolved oxidation catalyst. Reaction liquor is withdrawn from a point near the bottom of the body thereof, passed through coolers external to the main body of liquor, and returned at a point near the top of the main body of liquor at such a rate as to maintain an acetaldehyde differential from top to bottom of not more than about 1%. The air input is regulated so that there is only a fraction of a per cent of oxygen in the gas-vapor mixture issuing from the top of the body of reaction liquor. This gas-vapor mixture, substantially free from oxygen, is scrubbed with cold acetic acid to remove aldehyde contained therein and the wash liquor from this scrubbing operation is introduced into the body of reaction liquor.

Since the liquid and vapor in contact with equipment is of a corrosive nature, it is advisable to use acid-resistant materials in construction. A steel containing 18-19% chromium, 8-9% nickel, and the remainder chiefly iron is suitable for this purpose.

Since air is the cheapest oxidizing material and is quite suitable for the process, it is naturally preferred but other gas mixtures containing about the same proportion of oxygen and the remainder inert gases are its full equivalent.

Temperatures in excess of 90° C. are undesirable because they result in excessive formation of by-products and vaporize unduly large quantities of acetaldehyde. On the other hand, temperatures below about 40° C. retard the oxidation reaction with the common catalysts, and do not utilize heat transfer equipment as effectively as desirable. Rather high pressures are preferred because they increase the rate of oxygen dissolution and hence increase the rate of reaction, and because they reduce the amount of acetaldehyde and acetic acid vaporized and facilitate removal thereof from the vapors.

Since the reaction between dissolved acetaldehyde and molecular oxygen at temperatures below 100° C. proceeds relatively slowly in the absence of a catalyst, it is desirable to employ an oxidation catalyst such as manganese acetate.

It is preferred to deprive the gas-vapor mixture of substantially all of its oxygen before it issues from the body of reaction liquor because it is found that mixtures of oxygen and acetaldehyde, though not explosive when submerged in the reaction liquor, are sometimes explosive when present in a free vapor space such as a scrubbing tower.

The following specific example illustrates one of numerous methods of carrying out the process of this invention:

With reference to the accompanying drawing, A and B represent respectively the bottom and top or oxidizing and scrubbing sections of a vessel wherein acetaldehyde is oxidized to acetic acid. Section A is an unpacked column somewhat over 20 feet in height while section B is a packed column about 14 feet in height. Both sections are constructed of suitable acid-resistant material. C, C" and C"' are tubular heat exchangers provided with baffles to cause a liquid flowing outside the tubes to pursue a tortuous path across and around the tubes.

During operation, the oxidizing section A is kept filled to a depth of about 20 feet (including gas bubbles) with an acetic acid liquor containing about 90% by weight of acetic acid, 10% by weight of acetaldehyde, and a small amount, say 0.1%, of dissolved manganese acetate. The acetaldehyde concentration in this body of liquor varies only slightly from top to bottom, generally being not more than about ⅔% richer in aldehyde at the top than at the bottom. The temperature of the liquor increases progressively from top to bottom, varying from about 40° C. at the top to about 60° C. at the bottom. An absolute pressure of 140 pounds per square inch is maintained therein. Air previously compressed to about 150 pounds per square inch and cooled to remove water is introduced continuously at 1 and is dispersed in the acetic acid liquor in A by any conventional distributing means (not shown). The air passes up through A, where it is denuded of its free oxygen to a content of a few tenths of 1%, then through packed section B, where it is denuded of acetaldehyde vapor. The residual gas, mainly nitrogen and a small quantity of acetaldehyde vapor, may be withdrawn at 2 and passed to a water scrubber to complete the removal of acetaldehyde. Acetaldehyde is introduced continuously at 3 and the acetic acid liquor is removed at 4. Part of the liquor withdrawn at 4 is removed via 5 for further purification, according to requirements. A much greater portion, however, amounting to 150 times the weight of aldehyde feed, is removed via 6 for recirculation through the coolers C', C" and fresh catalyst solution is introduced at 6a. In these coolers water is passed through the tubes and the acetic acid liquor is passed outside the tubes where it is caused to pursue a tortuous path around the baffles. Most of the recirculated acetic acid liquor, after being cooled to 40° C. in the first two coolers, is reintroduced via 7 into section A of the oxidizing vessel at a point near the top thereof. The remaining portion of the recirculated acetic acid liquor, after passing through coolers C' and C", is passed through the third cooler C"' where it is cooled to 15° C. and is introduced via 8 into the top of column B. This cold liquor flows down through column B countercurrent to gas and vapor rising therein and serves to cool and condense acetaldehyde vapors. It then passes into the top of column A where it mingles with entering acetaldehyde and acetic acid and becomes a part of the body of liquor in this column.

The portion of the recirculated acetic acid liquor introduced into the top of section A has the functions of diluting the aldehyde introduced at 3 and of cooling the reaction liquor. The smaller portion of recirculated liquor introduced into the top of B, in addition to cooling the reaction liquor, serves to scrub the effluent gases and vapors from section A to remove therefrom acetic acid and aldehyde and restore the same to section A.

I claim:

1. In a process of oxidizing acetaldehyde to acetic acid by contacting an oxygen-containing gas with an acetic acid solution of acetaldehyde, the improvement which comprises controlling the introduction of acetaldehyde to the reaction zone and the withdrawal of acetic acid solution of acetaldehyde therefrom so as to maintain the concentration of acetaldehyde in the reacting liquor at not exceeding 15% by weight and so as to maintain the acetaldehyde concentration in the effluent acetic acid solution at not less than 5% by weight.

2. In a process of oxidizing acetaldehyde to acetic acid by contacting an oxygen-containing gas with an acetic acid solution of acetaldehyde, the improvement which comprises controlling the introduction of acetaldehyde to the reaction zone and the withdrawal of acetic acid solution of acetaldehyde therefrom so as to maintain the concentration of acetaldehyde in the reacting liquor at not exceeding 15% by weight and so as to maintain the acetaldehyde concentration in the effluent acetic acid solution at not less than 5% by weight, and controlling the contact of oxygen-containing gas and acetic acid solution of acetaldehyde so as to form an effluent gas mixture containing less than 1% of free oxygen.

3. In a process of oxidizing acetaldehyde to acetic acid by bubbling air up through a body of acetic acid solution of acetaldehyde, the improvement which comprises maintaining the body of acetic acid solution of acetaldehyde at a temperature between 40° and 90° C., adding acetaldehyde thereto and withdrawing acetic acid solution of acetaldehyde therefrom at rates controlled so as to provide an acetaldehyde concentration therein not exceeding 15% by weight and so as to maintain the acetaldehyde concentration of the effluent solution at not less than 5% by weight, and controlling the contact of air and acetic acid solution of acetaldehyde so as to form an effluent gas mixture containing less than 1% of free oxygen.

4. In a process of oxidizing acetaldehyde to acetic acid by bubbling an oxygen-containing gas through a mass of acetic acid solution of acetaldehyde, the improvement which comprises introducing acetaldehyde into said mass of solution and withdrawing an acetic acid solution of acetaldehyde from said mass of solution at rates controlled to maintain in the reacting liquor an acetaldehyde concentration of not more than 15% by weight and in the effluent acetic acid an acetaldehyde concentration of not less than 5% by weight, withdrawing acetic acid solution of acetaldehyde from said mass thereof, cooling said solution and returning the cooled solution to said mass, and maintaining the differential between the acetaldehyde concentrations in the mass of solution at the points of withdrawal and return at not more than about 1%.

5. A process of oxidizing acetaldehyde to acetic acid which comprises passing an oxygen-containing gas into intimate contact with a mass of acetic acid solution of acetaldehyde and oxidation catalyst, at a temperature between 40° and 90° C., introducing acetaldehyde into said mass of solution, maintaining the concentration of acetaldehyde in the reacting liquor between 5% and 15% by weight, withdrawing solution therefrom, and maintaining the differential between acetaldehyde concentrations in the acetaldehyde-inlet section and in the solution-outlet section of said mass of solution at not more than about 1%.

6. A process of oxidizing acetaldehyde to acetic acid which comprises passing air into intimate contact with a body of acetic acid solution of acetaldehyde at a temperature between 40° and 90° C. containing a dissolved oxidation catalyst, introducing acetaldehyde into said body of solution, maintaining the concentration of acetaldehyde in the reacting liquor between 5% and 15% by weight, withdrawing solution therefrom, and maintaining the differential between acetaldehyde concentrations in the acetaldehyde-inlet section and in the solution-outlet section of said body of solution at not more than about 1%.

7. A process of oxidizing acetaldehyde to acetic acid which comprises providing a body of an acetic acid solution of acetaldehyde at a temperature between 40° and 90° C. and at an absolute pressure between 100 pounds and 200 pounds per square inch containing a catalytic amount of manganese acetate, maintaining the acetaldehyde concentration between 5% and 15% by weight of the solution, continuously introducing acetaldehyde into the top of said body of solution, continuously bubbling air up through said body of solution and controlling the contact of air and solution so as to form an effluent gas-vapor mixture containing less than 1% of free oxygen, continuously withdrawing solution from the bottom of said body thereof, cooling a major portion of the solution thus withdrawn, recirculating the solution thus cooled to the top of said body of solution, and maintaining the differential between acetaldehyde concentrations at the top and at the bottom of said body of solution at not more than about 1%.

8. A process of oxidizing acetaldehyde to acetic acid which comprises providing a body of an acetic acid solution of acetaldehyde at a temperature between 40° and 90° C. and at an absolute pressure between 100 pounds and 200 pounds per square inch containing a catalytic amount of manganese acetate, maintaining the acetaldehyde concentration between 5% and 15% by weight of the solution, continuously introducing acetaldehyde into the top of said body of solution, continuously bubbling air up through said body of solution and controlling the contact of air and solution so as to form an effluent gas-vapor mixture containing less than 1% of free oxygen, continuously withdrawing solution from the bottom of said body thereof, cooling a major portion of the solution thus withdrawn, recirculating a major part of the solution thus cooled to the top of said body of solution, further cooling another portion of the solution thus cooled, scrubbing the effluent gas-vapor mixture therewith, and then returning it to the top of said body of solution, and maintaining the differential between acetaldehyde concentrations at the top and at the bottom of said body of solution at not more than 1%.

9. A process of oxidizing acetaldehyde to acetic acid which comprises providing a body of an acetic acid solution of acetaldehyde at a temperature between 40° and 90° C. and at an absolute pressure between 100 and 200 pounds per square inch containing a catalytic amount of manganese acetate, maintaining the acetaldehyde concentration between 5% and 15% by weight of the solution, continuously introducing acetaldehyde into the top of said body of solution, continuously bubbling air up through said body of solution and controlling the contact of air and solution so as to form an effluent gas-vapor mixture containing less than 1% of free oxygen, continuously withdrawing solution from the bottom of said body thereof, cooling a major portion of the solution thus withdrawn, recirculating a major part of the solution thus cooled to the top of said body of solution, further cooling another portion of the solution thus cooled, scrubbing the effluent gas-vapor mixture therewith, then returning it to the top of said body of solution, and regulating the recirculation of cooled solution so as to maintain the differential between acetaldehyde concentrations at the top and at the bottom of said body of solution at not more than 1%.

DWIGHT C. BARDWELL.